March 26, 1940.    N. TESTI    2,194,815
SHAVING IMPLEMENT
Filed July 8, 1936
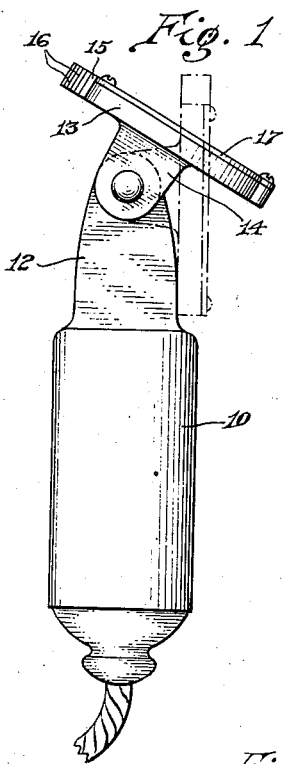
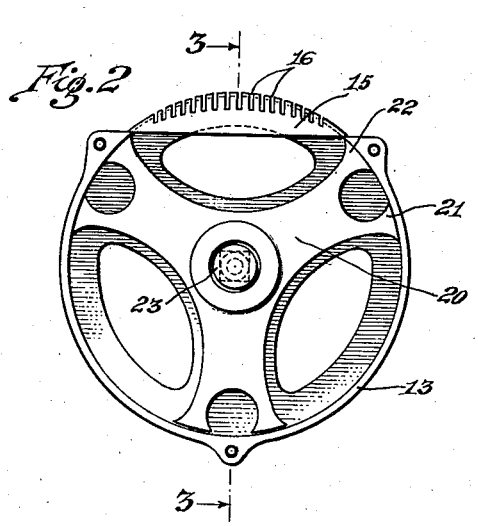
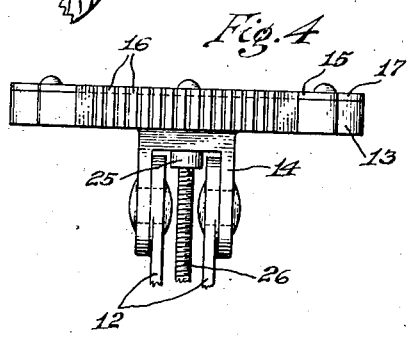
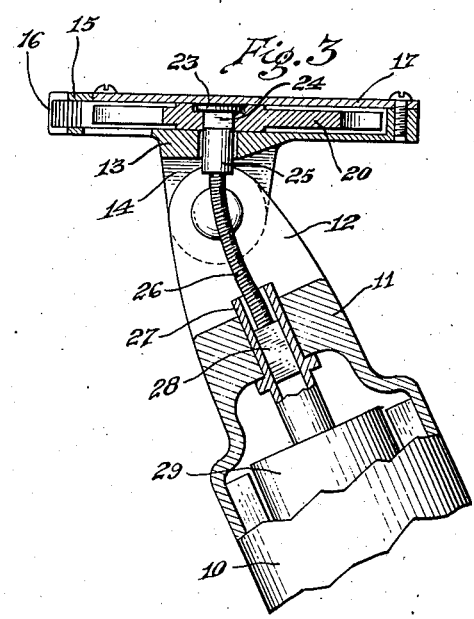
INVENTOR
Nicholas Testi
BY
ATTORNEY Patented Mar. 26, 1940

2,194,815

UNITED STATES PATENT OFFICE 2,194,815

SHAVING IMPLEMENT

Nicholas Testi, Boston, Mass., assignor to Gillette Safety Razor Company, Boston, Mass., a corporation of Delaware Application July 8, 1936, Serial No. 89,617

5 Claims. (Cl. 30—43)

This invention relates to shaving implements of the type employing co-operating shearing members, being generally adapted to be used for shaving without lather.

An important feature of the invention consists in a thin circular or segmental member adapted to make contact in an arcuate area with the face of the user and having shearing members operative in such curved area. An instrument of this kind may be conveniently moved over the face of the user, positioned at all desired angles and moved into hollows or into valleys in the contour of the body. Moreover, a close shaving action may be secured by the use of such an instrument because the skin of the user is depressed slightly and stretched thereby in an arcuate depression so that the effective shearing plane is brought close to the surface of the skin.

As herein shown the implement includes a thin flat circular casing having a narrow cylindrical circumferential surface provided in a limited area with a series of parallel slots providing stationary or fixed shearing teeth and serving as a guard for a rotary cutting element which is journaled to rotate within the casing. The rotary cutting element is shown as mounted concentrically in the circular casing and provided with one or more cutting edges disposed parallel to the axis of the cutter and maintained in engagement with the curved inner wall of the casing and in shearing relation to the stationary teeth therein.

Preferably the cutter casing is pivotally connected to a handle member which may contain a driving motor for the cutter. A driving connection is maintained between the cutter and the motor in the handle by a flexible shaft and the organization is such that the shaft is normally flexed in a direction to urge the cutter bodily toward that side of the casing wherein the stationary shearing teeth are provided. By this construction there is insured an even and yielding shearing engagement between the two members, resulting in long life to the instrument and clean and effective cutting while in operation.

These and other features of the invention will be best understood and appreciated from the following description of a preferred embodiment thereof, selected for purposes of illustration and shown in the accompanying drawing in which—

Fig. 1 is a view of the implement in side elevation approximately in actual size;

Fig. 2 is a plan view of the cutter casing with the cover plate removed to show the cutter therein, all on an enlarged scale;

Fig. 3 is a cross-sectional view of the implement on the same scale as Fig. 2 with portions broken away; and Fig. 4 is a view in elevation on the same scale of the cutter casing and its mounting.

The implement comprises a cylindrical hollow casing 10 which acts as a handle as well as a casing for the motor. At its upper end the casing 10 is provided with a head 11 and this merges into a pair of spaced upstanding ears 12. The circular cutting head or casing 13 is pivotally secured to the ears 12 by studs which extend through a pair of ears 14 projecting downwardly from its base or lower side wall. The head 13 is flanged to present a cylindrical peripheral wall and at one edge this wall merges into an overhanging segment 15 forming part of one side wall of the casing. Within a limited zone of this segment the entire edge of the casing is slotted to present shearing teeth 16, that is to say, a series of parallel slots is formed which pass through the base of the casing and its peripheral wall and a portion of the segment 15. A cover plate 17 is shaped to fit the straight inner edge of the segment 15 and thus provides a closure for the head or casing 13 which thus comprises a thin or shallow cylindrical disk.

A rotary cutter herein shown as having three radial blades is mounted to rotate within the head 13, its blades co-operating with the stationary shearing teeth 16 to cut any hairs entering the openings between the teeth 16. The end of each cutter blade is somewhat flared and provided with a circular opening with the result that each arm presents two undercut bevelled cutting edges 21 and 22. The hub of the cutter is of a thickness to fill the casing of the head 13 while its arms are reduced in thickness to clear the flat side walls of the casing.

The hub of the cutter 20 is provided with a square countersunk opening for connection with a driving shaft which, as shown in Fig. 3, comprises a circular flange 23 adapted to fit into the countersunk recess in the hub of the cutter, a square section 24 and a cylindrical section 25 loosely journaled in the base plate of the head 13. It will be understood that in the drawing the clearance between the section 25 and its bearing is greatly exaggerated to make it visible. To the lower end of the cylindrical section 25 is connected a flexible driving shaft 26 and the lower end of this is connected to a rectangular block of square cross-section which is arranged to slide freely in a square bore in the upper hollow journal of the rotor 29 which is contained within the casing 10. It will be seen that this construction leaves the rectangular block 28 free to work longitudinally in the journal member without in any way interfering with its driving efficiency. It also permits the user to tilt the shaving head 13 at any convenient angle while maintaining an uninterrupted driving connection with the cutter.

It will be noted further that when the head 13 is tilted as shown in Fig. 1 or 3, the flexible shaft 26 is bowed in such a manner that its resiliency tends always to urge the cutter toward the left, thus maintaining the co-operating shearing teeth always in yielding engagement and insuring clean cutting over a long period of use.

Having thus described my invention what I claim as new and desire to secure by Letters Patent of the United States is:

1. A shaving implement having a handle with a closed casing pivotally mounted thereon and presenting a narrow cylindrical edge portion with short transverse slots therein forming an arcuate grill adapted to engage the face of the user over a relatively small area, and a power-operated rotary cutter therein having a straight shearing edge disposed in parallel relation to its axis of rotation.

2. A shaving implement having a combined handle and motor casing, a thin flat cylindrical casing pivotally connected thereto for angular adjusting movement and having its circumferential face provided with stationary shearing teeth, a rotary cutter journaled in said cylindrical casing, and a flexible driving shaft therefor extending between the handle and the rotary cutter.

3. A shaving implement having a combined handle and motor casing, a cylindrical casing pivotally connected thereto for limited angular adjusting movement and having a portion of its periphery slotted to present fixed shearing teeth in a limited zone, a rotary cutter loosely journaled in the latter casing, and a resilient flexible shaft for driving the cutter arranged to be flexed in a direction tending to takeup lost motion by urging the cutter toward the zone of the shearing teeth.

4. A shaving implement including in its structure a cylindrical casing having flat side walls and provided in its circumferential edge with transverse slots presenting spaced shearing teeth in a limited zone, and a flat cutter journaled to rotate substantially concentrically within the casing, being relieved to clear the side walls of the casing and provided with a cutting edge disposed parallel to its axis of rotation.

5. A dry shaving implement including in its structure a head having a flat circular side wall provided with a cylindrical peripheral wall merging into a flat overhanging segment, the segment and adjacent cylindrical wall being slotted to present a series of stationary shearing teeth arranged in an arcuate manner, and a rotary cutter having co-operating shearing teeth disposed parallel to its axis of rotation.

NICHOLAS TESTI.